March 23, 1954 — R. L. SIMPKINS ET AL — 2,672,653
INJECTION MOLD
Filed March 26, 1952 — 2 Sheets-Sheet 1
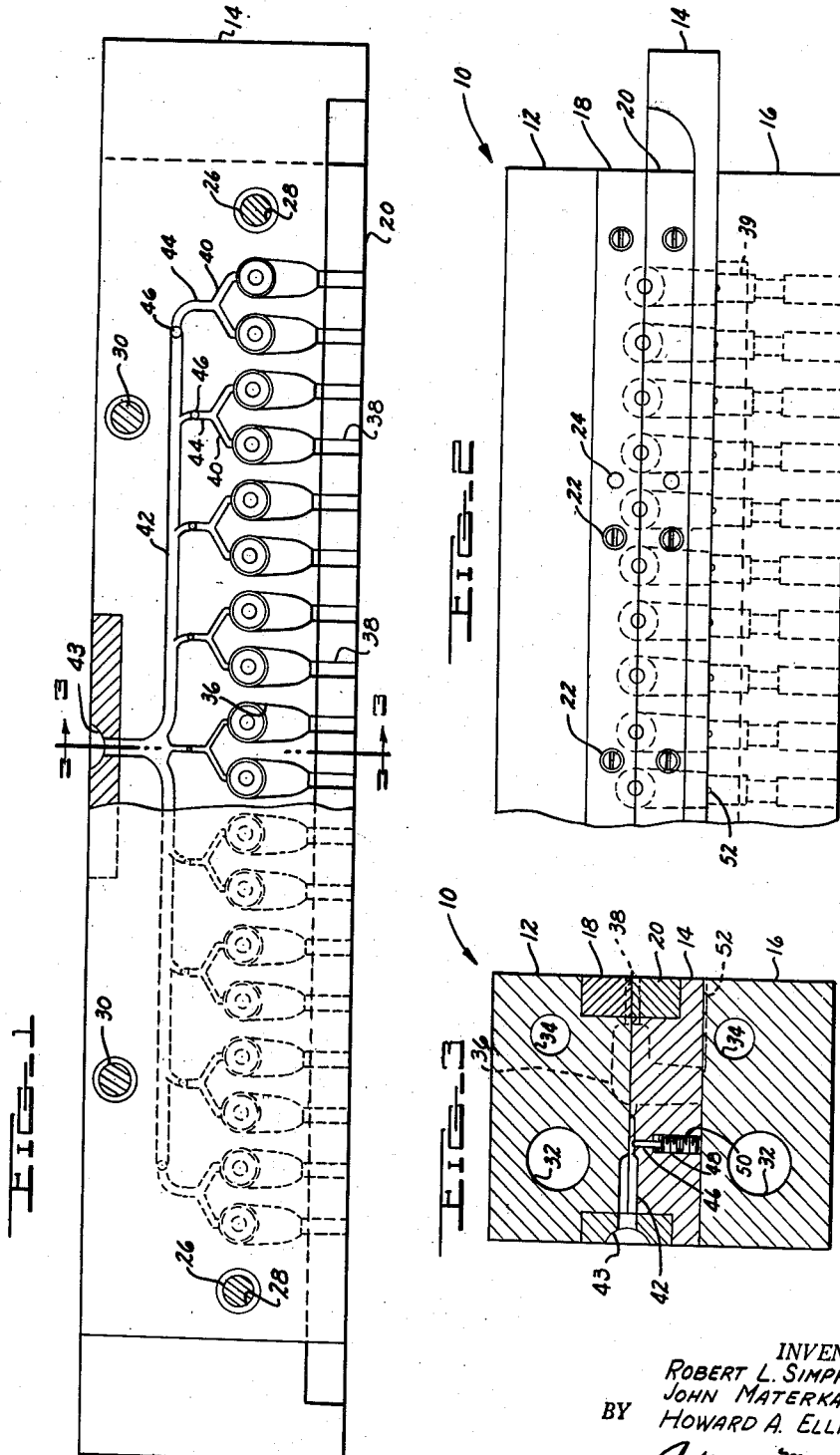
INVENTORS
ROBERT L. SIMPKINS
JOHN MATERKA
HOWARD A. ELLIOTT
BY
Arthur M. Smith
ATTORNEY

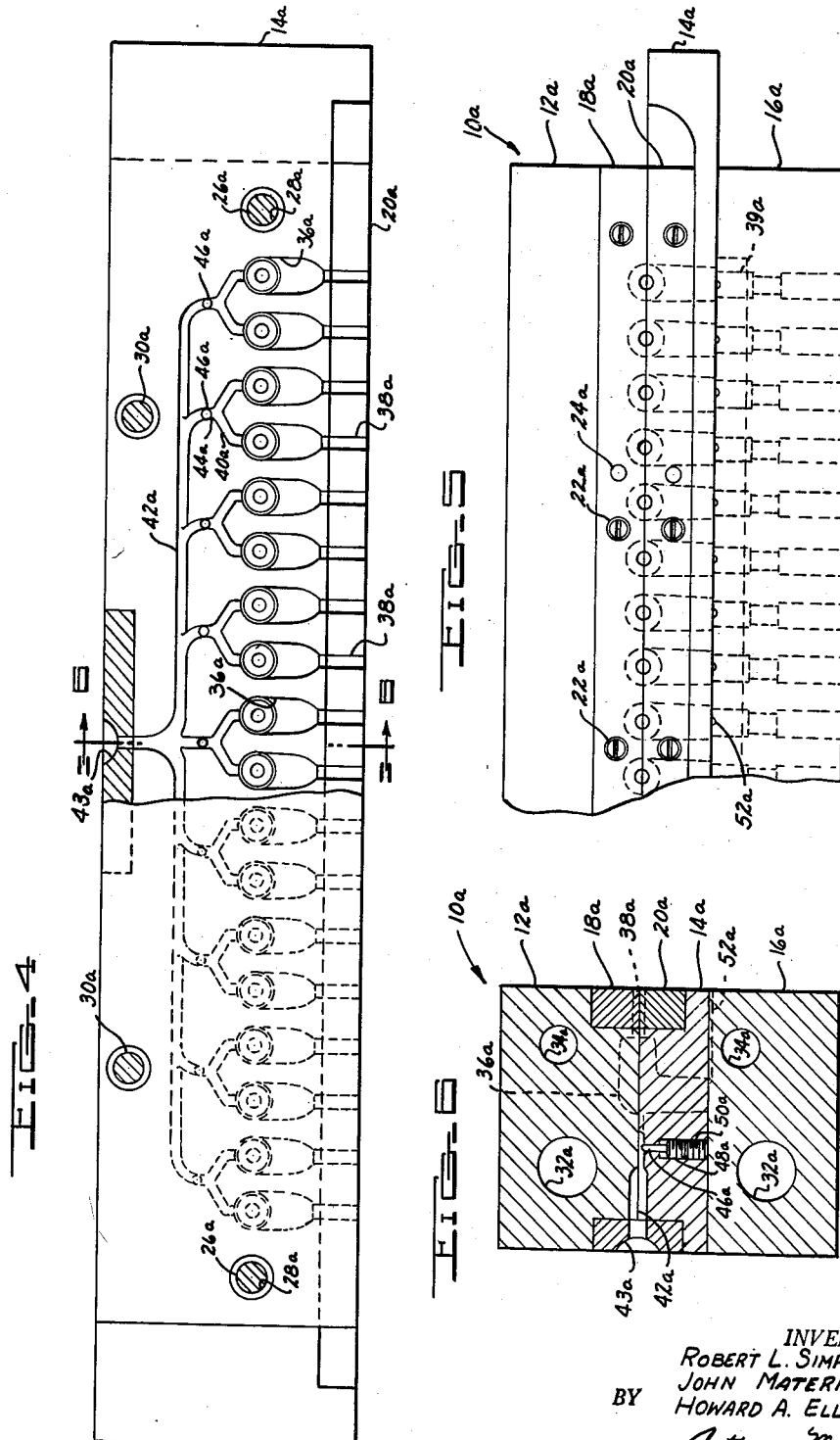

Patented Mar. 23, 1954

2,672,653

UNITED STATES PATENT OFFICE 2,672,653

INJECTION MOLD

Robert L. Simpkins, Royal Oak, John S. Materka, Dearborn, and Howard A. Elliott, Detroit, Mich., assignors to Essex Wire Corporation, Detroit, Mich., a corporation of Michigan Application March 26, 1952, Serial No. 278,668

3 Claims. (Cl. 18—42)

The present invention relates to apparatus for molding, and more particularly in injection type molds for molding grommets, terminals, spark plug insulators, or the like on electric conductors. The subject matter of this invention constitutes an improvement over our prior patent, No. 2,578,492, granted December 11, 1951.

In the aforesaid patent, it was explained that the conventional injection type mold previously used provided runners and gates for conducting plastic or rubber-like materials from the sprue to the mold cavity. When the plastic or rubber-like materials of thick dough-like consistency were injected into such molds under great pressure, their flow was slow because of great friction encountered in the relatively small runner channels. Also, the materials flowed into and filled the cavities nearest the sprue first, progressively filling each cavity further away. This was of no consequence in many types of molding; but in the field of molding terminals, grommets, spark plug insulators, or the like, it constituted a serious barrier. The difficulty arose from the fact that the cavities near the sprue filled first, after which the compound exerted high pressure against the conductors in the cavities. This tended to shove the conductors, or terminal elements, or the like, out of place in the cavity, or cause the molded part to be applied at some undesirable place on the conductor because the latter had moved.

The cavities near the sprue continued to receive the high pressure, as the other cavities filled, so that this condition advanced progressively away from the sprue to the end cavities which filled last, resulting in wide variation in the amount of shove due to the time element. Thus, it was found that the molded parts of the first-filled cavities were distorted progressively more than the molded parts of each successively filled cavity.

The molding apparatus disclosed in the aforesaid patent was developed to overcome the problems associated with the conventional injection type molds previously used. In this molding apparatus, the cross sectional area of the gate runner was progressively increased as the cavities were placed farther from the sprue, and the cavities could then be filled simultaneously overcoming the shortcomings of the prior art devices. It has been found that the principle of increasing the gate runners, as the cavities are located further from the sprue works well, providing the designed conditions are always held. However, as development of production of various items has continued, it has frequently been found that original estimates in regard to the injection rate have been conservatively low. When the injection rate has been raised, it is sometimes found that some cavities will fill more rapidly than others, indicating that a new proportion is needed for the gate runner sizes, particularly when such injection rate is increased sharply.

Moreover, over a long period of time there has been encountered enough variation in the raw material to change the relative hardness of the injection stock which again has been found to cause some of the cavities to fill more rapidly than others. This same problem has arisen when stocks have been inadvertently stored too long prior to use.

Even though the changes encountered in the runner proportions to accommodate these varying conditions of injection rates and stock hardness were relatively minor, once the changes have been made, it is very impractical to restore the former proportions to the runners should conditions require it. Also, removal of the molds and recutting the runners has been found to be very inconvenient and expensive.

As has been pointed out previously, the key to successful molding on wire conductors is to achieve simultaneous filling of all the cavities. Accordingly, it is the primary object of the present invention to provide an improved molding apparatus which will embody all the desirable features of our prior molding apparatus and which will have greater application by virtue of adjusting means incorporated therein for readily varying the effective sizes of the runners, thereby accommodating changes in the operating conditions which may from time to time occur.

It is another object of the present invention to provide an improved molding apparatus of the foregoing character wherein the adjusting means includes pins extending into the runners which are adjustable to vary the effective cross sections of such runners.

It is still another object of the present invention to provide a multiple cavity mold for molding grommets, terminals, spark plug insulators, or the like on electric conductors, which molds have runners of predetermined size for conducting plastic or rubber-like material from the sprue to the cavities of the mold, and which has adjusting means associated with the runners for varying the effective sizes thereof to effect substantially simultaneous filling of the cavities under normal operating conditions.

Other objects of this invention will appear in the following description and appended claims, reference being had to the accompanying drawings forming a part of this specification wherein like reference characters designate corresponding parts in the several views.

In the drawings:

Fig. 1 is a plan view of one embodiment of the invention with a portion of the top section broken away;

Fig. 2 is a fragmentary front elevation of the sectional die;

Fig. 3 is a section taken on the line 3—3 of Fig. 1;

Fig. 4 is a plan view of another embodiment of the invention with a portion of the top section broken away;

Fig. 5 is a fragmentary front elevation of the sectional die shown in Fig. 4; and Fig. 6 is a section taken on the line 6—6 of Fig. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, one embodiment of the present invention can be seen in Figs. 1 to 3 which is particularly adapted for use in molding spark plug insulators on electric conductors. It should be understood, however, that the invention is not limited to this particular modification, but can be used equally well for molding terminals, grommets, or the like on electric conductors.

In the embodiment of the invention shown in Figs. 1 to 3, a sectional die 10 is formed from a plurality of sections 12, 14, 16, 18, and 20. Sections 18 and 20 are secured to sections 12 and 14, respectively, by a plurality of screws and dowel pins, shown by way of example at 22 and 24. If desired, sections 12 and 18 and sections 14 and 20 may be integral. However, these are made separate to facilitate machining therein the cavities, runners, and the like which will be described hereinafter.

Extending upwardly from the lower die section 16 are two dowel pins 26 press-fitted into apertures of said section 16 and extending upwardly through bushed apertures 28 of die sections 12 and 14 when the complementary sections are brought together, thus, to accurately align said die sections. Additional dowel pins 30, not all shown, project downwardly from the upper die section 12 and are adapted to be received in die section 14 and still other dowel pins, not shown, project upwardly from die section 16 in mating relation in apertures, not shown in die sections 14. It will be understood that any such suitable arrangement may be used for maintaining the die sections in proper alignment.

A pair of holes 32 extend through the sectional die 10 and are adapted to receive conventional cartridge type heater elements, not shown, and a second pair of holes 34 also extend therethrough in which conventional thermostats, not shown, are mounted. The heater elements are used to maintain the sectional die 10 at the proper temperature so that plastic or rubber-like materials injected into sectional die 10 will not be cured prematurely.

Formed in the upper die section 12 are a plurality of recesses which are adapted to register with and complement a similar number of recesses in the middle die section 14 to form a plurality of spark plug insulator cavities, as at 36.

Extending outwardly from one end of each of the spark plug insulator cavities 36 is a wire-receiving passage, shown by way of example, at 38. The other end of each of the cavities 36 has an opening as at 39 leading thereinto through the die section 16. These openings 39 are adapted for receiving and holding an insert pin, not shown, which serve as a core during the molding operation for forming the receptacle end of the spark plug insulator. By virtue of this construction of the molding apparatus, wire conductors having metal elbow terminals attached thereon can be inserted between the die sections 12 and 14 with the metal elbow terminals positioned within the cavities 36 and the conductors extending through the passages 38. The inserts, not shown, will extend up from the lower die sections 16 into the metal elbow terminals for supporting the latter and also to form a core around which the plastic or rubber-like materials will flow when injected into the sectional die 10. For a more detailed disclosure of this type of spark plug insulator, reference is made to our co-pending applications, each entitled, Insulated Terminal, Serial Nos. 208,768 and 225,104, filed January 31, 1951 and May 8, 1951, respectively.

Formed in the upper surface of the middle die section 14 and joining each pair of spark plug insulator cavities 36 are a plurality of gates, one of which is indicated at 40, which gates are increasingly smaller in size as they approach the longitudinal center of the sectional die 10. Each of the gates 40 communicates with a main runner 42, which extends and communicates with the sprue 43 through which the plastic or rubber-like material is injected under high pressure. Communicating with each of the gates 40 are gate runners, as indicated at 44, which open into the main runner 42. The surface of each of these runners is preferably polished so as to offer the least resistance to flow of the plastic or rubber-like material which will flow therethrough.

Each of the gate runners 44 are progressively smaller in cross section as they approach the longitudinal center of sectional die 10, in much the same manner as the gates 40. This feature can be seen best in Fig. 1, and for a more detailed discussion of the runner and gate construction reference is made to our aforesaid patent.

By virtue of the structure described above, the plastic or rubber-like material of thick dough-like consistency can be injected through the sprue 43 and the various runners and gates into the spark plug insulator cavities 36. The cross sectional areas of the respective gate runners 44 are uniformly decreased in size so that the materials when injected under the conditions for which the molding apparatus was designed will fill the cavities 36 substantially simultaneously.

However, as explained earlier, it is not always possible to maintain the conditions for which the molding apparatus was designed. In order to compensate for variations in the design conditions, axially movable pins, as illustrated at 46, have been provided, one each to project through the wall of each of the gate runners 44. The pins 46 are integral with screw portions 48, Fig. 3, so that each can be advanced into or withdrawn from its associated runner, thereby reducing or increasing the effective cross section of such runner. This, it will be understood, will alter the rate at which the cavity 36 which is in communication with such runner will be filled. A set screw 50 may be provided with each of the pins 46 to act as a lock member. It is to be understood that other means are contemplated for use in varying the effective cross sections of the gate runners which do not depart from the spirit of the present invention.

As was previously pointed out, the key to successful molding on electric conductors is to achieve simultaneous filling of all the cavities. This can now be accomplished with the present invention. When variations in the designed conditions of the molding apparatus occur so that the cavities are not simultaneously filled, it is only necessary to advance slightly the adjusting pins 46, which are associated with the most rapid filling cavities, thereby to restrict the flow of the compound and delay filling to a small extent. Usually this results in another cavity filling too soon. The adjusting pin of that runner is moved in slightly etc., until all cavities fill at the same time under the specific operating conditions which are expected to be maintained.

The operator of the molding apparatus can easily determine when each cavity 36 has been filled by observing the bleeder ports 52 which lead from each of the cavities. As soon as one of the cavities is filled, the compound will begin to flow from the associated bleeder port.

The above principle can be carried out by using it in a mold with uniform runner sizes and adjusting the runner proportions by use of the adjusting screws alone. A modified form of the invention embodying these features is disclosed in Figs. 4 to 6 of the drawings, and all corresponding parts are identified by the same reference numbers followed by the letter "a."

It will be observed in this modification that all the gates 40a are substantially the same size and likewise, each of the gate runners 44a are of substantially the same cross sectional area. The adjusting screws 46a must be relied upon entirely to regulate the flow of the compound so that simultaneous filling of the cavities is effected. This modification may be desirable for use in instances where the operating conditions are apt to be more irregular than when using the previously described embodiment of the invention.

From the foregoing, it can be understood that the present invention includes all the desirable features of the invention described in our prior patent, and it includes improvements thereover permitting optimum molding to be effected even though the operating conditions for which the molding apparatus was designed have been departed from, such as may be due to changes in the compound materials used, or in the rate of injection of the compound, etc.

Having thus described our invention, we claim:

1. A molding apparatus for molding a plurality of grommets, terminals, spark plug insulators or the like on electric conductors, comprising a sectional die, a sprue formed in said sectional die, a plurality of cavities formed between adjacent sections of said die at selected distances from said sprue, a plurality of runners in said sectional die forming passages between each of said cavities and said sprue, and a plurality of adjustment screws mounted in said die and having their ends projecting respectively into said passages and each screw being adjustable to vary the effective cross section of its associated passage.

2. A molding apparatus for molding a plurality of grommets, terminals, spark plug insulators or the like on electric conductors, comprising a sectional die, a sprue formed in said sectional die, a plurality of cavities formed between adjacent sections of said die at varying distances from said sprue, a main runner of uniform cross section extending from said sprue to the cavity farthest from said sprue, gate runners extending between said main runner and each of said cavities, the runners leading to cavities nearest to said sprue having smaller cross sections than those farther from said sprue, and means associated with said runners for varying the effective cross sections thereof, the last-named means comprising a plurality of adjustable screws mounted in said die and each having its end projecting into its associated runner for varying the effective cross section thereof.

3. A molding apparatus for molding a plurality of grommets, terminals, spark plug insulators or the like on electric conductors, comprising a sectional die, a sprue formed in said sectional die, a plurality of cavities formed between adjacent sections of said die at various distances from said sprue, a main runner of uniform cross section extending from said sprue to the cavity farthest from said sprue, gate runners of uniform cross section extending between said main runner and each of said cavities, and means associated with said runners for varying the effective cross sections thereof, the last-named means comprising a plurality of adjustable screws mounted in said die and each having its end projecting into its associated runner for varying the effective cross section thereof.

ROBERT L. SIMPKINS.
JOHN S. MATERKA.
HOWARD A. ELLIOTT.

References Cited in the file of this patent

UNITED STATES PATENTS

| Number | Name | Date |
|---|---|---|
| 267,960 | Wolf | Nov. 21, 1882 |
| 2,578,492 | Simpkins et al. | Dec. 11, 1951 |

FOREIGN PATENTS

| Number | Country | Date |
|---|---|---|
| 567,349 | Great Britain | Feb. 9, 1945 |